(12) United States Patent
Malik et al.

(10) Patent No.: US 12,092,871 B2
(45) Date of Patent: Sep. 17, 2024

(54) ACTIVE-PASSIVE PHOTONIC INTEGRATED CIRCUIT PLATFORM

(71) Applicants: Aditya Malik, Santa Barbara, CA (US); Hyun Dai Park, Goleta, CA (US); Tin Komljenovic, Goleta, CA (US)

(72) Inventors: Aditya Malik, Santa Barbara, CA (US); Hyun Dai Park, Goleta, CA (US); Tin Komljenovic, Goleta, CA (US)

(73) Assignee: NEXUS PHOTONICS LLC, Goleta, CA (US)

( * ) Notice: Subject to any disclaimer, the term of this patent is extended or adjusted under 35 U.S.C. 154(b) by 103 days.

(21) Appl. No.: 17/573,916

(22) Filed: Jan. 12, 2022

(65) Prior Publication Data
US 2023/0244034 A1 Aug. 3, 2023

(51) Int. Cl.
G02B 6/14 (2006.01)
G02B 6/122 (2006.01)
G02B 6/13 (2006.01)
G02B 6/12 (2006.01)

(52) U.S. Cl.
CPC ............ *G02B 6/14* (2013.01); *G02B 6/1228* (2013.01); *G02B 6/13* (2013.01); *G02B 2006/12142* (2013.01)

(58) Field of Classification Search
CPC .......... G02B 6/14; G02B 6/1228; G02B 6/13; G02B 2006/12142; G02B 6/12002; G02B 6/12004
USPC ...................... 385/1, 14, 15, 28, 43, 50, 131
See application file for complete search history.

(56) References Cited

U.S. PATENT DOCUMENTS

| | | | |
|---|---|---|---|
| 8,098,969 B2 * | 1/2012 | Tolstikhin | H01S 5/5018 385/14 |
| 10,641,959 B1 * | 5/2020 | Park | G02B 6/1228 |
| 10,718,898 B1 * | 7/2020 | Park | G02B 6/1228 |
| 10,859,764 B2 * | 12/2020 | Park | G02B 6/13 |
| 11,209,592 B2 * | 12/2021 | Zhang | G02B 6/12004 |
| 11,287,573 B1 * | 3/2022 | Zhang | G02B 6/1228 |
| 11,480,734 B2 * | 10/2022 | Park | G02B 6/1228 |
| 11,719,883 B1 * | 8/2023 | Zhang | G02B 6/305 385/14 |
| 2003/0007719 A1 * | 1/2003 | Forrest | G02B 6/12004 385/14 |

(Continued)

*Primary Examiner* — Andrew Jordan
(74) *Attorney, Agent, or Firm* — Shalini Venkatesh

(57) ABSTRACT

A device has a plurality of waveguide structures including two active (one of which comprises two sub-layers), two passive, and three intermediate waveguide structures on a common substrate. At least partial butt coupling between active and intermediate waveguide structures, and tapering in the intermediate and/or passive waveguide structures at each junction therebetween facilitates efficient optical mode transformations as optical signals travel through the device, either from a first sub-layer of the first active waveguide structure through the other sub-layer, then sequentially though a first intermediate waveguide structure, a passive waveguide structure, a second intermediate waveguide structure, a second active waveguide structure, a third intermediate structure, and a second passive waveguide structure; or in reverse from the second passive waveguide structure back through to the first sub-layer of the first active waveguide structure. Lithographic alignment marks facilitate precise mutual alignments between layers defining each of the waveguide structures.

15 Claims, 9 Drawing Sheets

(56) References Cited

U.S. PATENT DOCUMENTS

| | | | |
|---|---|---|---|
| 2006/0093369 A1* | 5/2006 | Nagarajan | H04J 14/02 398/135 |
| 2011/0135314 A1* | 6/2011 | Tolstikhin | H01S 5/0262 398/149 |
| 2020/0233149 A1* | 7/2020 | Park | G02B 6/1228 |
| 2020/0284979 A1* | 9/2020 | Park | G02B 6/12004 |
| 2021/0088727 A1* | 3/2021 | Park | G02B 6/13 |
| 2021/0373235 A1* | 12/2021 | Zhang | G02B 6/1228 |
| 2022/0120970 A1* | 4/2022 | Zhang | G02B 6/12004 |
| 2023/0086803 A1* | 3/2023 | Hassan | G02B 6/136 |
| 2023/0208101 A1* | 6/2023 | Kuyken | H01S 5/1025 356/326 |
| 2023/0244034 A1* | 8/2023 | Malik | G02B 6/12004 385/14 |
| 2023/0266532 A1* | 8/2023 | Zhang | G02B 6/305 385/14 |
| 2023/0352908 A1* | 11/2023 | Komljenovic | H01S 5/028 |
| 2023/0361534 A1* | 11/2023 | Zhang | H01S 5/2031 |

* cited by examiner

ACTIVE-PASSIVE PHOTONIC INTEGRATED CIRCUIT PLATFORM

CROSS REFERENCE TO RELATED APPLICATION

This application is related to U.S. application Ser. No. 16/254,883 and Ser. No. 16/600,349, filed 2019 Jan. 23 and 2019 Oct. 11 respectively.

FIELD OF THE INVENTION

The present invention relates to semiconductor processing. More specifically, certain embodiments of the invention relate to a method and system for realization of photonic integrated circuits using dissimilar materials that are optically coupled.

BACKGROUND OF THE INVENTION

A photonic integrated circuit (PIC) or integrated optical circuit is a device that integrates multiple photonic functions and as such is analogous to an electronic integrated circuit. The major difference between the two is that a photonic integrated circuit provides functions for information signals imposed on optical carrier waves. The material platform most commonly utilized for photonic integrated circuits is indium phosphide (InP), which allows for the integration of various optically active and passive functions on the same chip. Although many current PICs are realized in InP platforms, there has been significant research in the past decade in using silicon rather than InP for the realization of PICs, due to some superior characteristics as well as superior processing capabilities for the former material, that leverage the investment already made for electronic integrated circuits.

The biggest drawback in using silicon for PICs is that it is an indirect bandgap material which makes it hard to provide electrically pumped light sources. This problem is generally solved by assembling PICs comprising two or more chips made from dissimilar materials in separate processes. Such an approach is challenging due to a need for very fine alignment, which increases packaging costs and introduces scaling limitations. Another approach to solve the bandgap problem is to bond two dissimilar materials and process them together, removing the need for precise alignment and allowing for mass fabrication. In this disclosure, we use the term "hybrid" to describe the first approach that includes precise assembly of separately processed parts, and we use the term "heterogeneous" to describe the latter approach of bonding two materials and then processing the bonded result, with no precise alignment necessary.

To transfer the optical signal between dissimilar materials, the heterogeneous approach utilizes tapers whose dimensions are gradually changed until the effective mode refractive indices in dissimilar materials match and there is efficient power transfer. This approach generally works well when materials have similar refractive indices as is the case with silicon and InP. Although InP and silicon-based PICs address many current needs, they have some limitations; among them are the fact that the operating wavelength range is limited by material absorption increasing the losses, and the fact that there is a limit on the maximum optical intensities and consequently optical powers that a PIC can handle. To address these limitations, alternate waveguide materials have been considered, such as SiN, $TiO_2$, $Ta_2O_5$, AlN, $LiNbO_3$, various polymers or others. In general, such waveguides have higher bandgap energies which provides better high-power handling and transparency at shorter wavelength, but, in general such materials also have lower refractive indices from visible to IR range e.g. SiN with bandgap of ~5 eV has refractive index of ~2, AlN has bandgap of ~6 eV and refractive index of around ~2, and $SiO_2$ with bandgap of ~8.9 eV has refractive index of ~1.44. For comparison, the refractive index of GaAs and InP is >3. In cases where there is larger difference in effective indices, such as between e.g. SiN and InP, GaAs or GaN, the requirements on taper tip dimensions become prohibitive limiting efficient power transfer. Specifically, extremely small taper tip widths (of the order of nanometers) may be necessary to provide good coupling. Achieving such dimensions is complex and may be cost prohibitive.

The alternative hybrid approach suffers from the drawbacks already mentioned above, namely the need for precise alignment, and correspondingly complex packaging and scaling limitations.

The above noted patent application Ser. No. 16/254,883 describes a method that provides efficient optical coupling between materials with dissimilar refractive indices (such as high-refractive index materials mentioned above, used for active devices, and low-refractive index materials used for waveguides), without requiring prohibitively narrow taper tips. This allows for scalable integration of materials for the realization of PICs to comprise active gain medium that can be used to realize laser and/or detectors and passive, high-performing waveguides.

Many applications require efficient phase modulators, e.g. to imprint data onto optical carrier or to control the phase of signals on the PIC. In this disclosure we will use term phase modulator, but it is to be understood that it includes any type of structure that can predominantly control the phase of an optical signal, and the functionality does not have to be limited just to modulating the signal. Compared to simple thermal tuners, semiconductor-based phase modulators can provide superior performance such as much higher bandwidth (up to 100 GHz or more), low power consumption (typically μW or less) and practically no crosstalk even in dense configurations.

With proper bandgap design, such semiconductor phase modulators can be modified to provide efficient amplitude modulation with reduced insertion loss as is known in the art of designing efficient electro-absorption modulators.

Furthermore, semiconductor-based waveguides can provide high nonlinearity that can be useful to generate harmonics, combs or other non-linear effects. With proper bandgap design, their absorption losses can be controlled, and non-linear effects optimized by using high refractive index contrast waveguides where core is the semiconductor material, while cladding is provided by low refractive index materials described above.

The U.S. application Ser. No. 16/254,883 and Ser. No. 16/600,349 referenced above disclose scalable integration of materials of very different refractive indices (such as, for example, the III-V materials mentioned above, used for active devices, and simple dielectric materials used for waveguides), without requiring prohibitively narrow taper tips between waveguides therein. PICs made by such a method can operate over a wide wavelength range from visible to IR and handle high optical power compared to typical Si-waveguide-based PICs. There remains, however, a need to develop and demonstrate a platform allowing for efficient, wafer-scale integration of high-performing amplitude and/or phase modulators with active gain medium to realize lasers and/or detectors that can be combined with highly non-linear semiconductor waveguides, all of which can be efficiently coupled to high-performance lower refractive index passive waveguides. Means to conveniently manipulate optical mode characteristics (such as phase) using active functionality within PICs would also be desirable.

DETAILED DESCRIPTION

Figure 1:
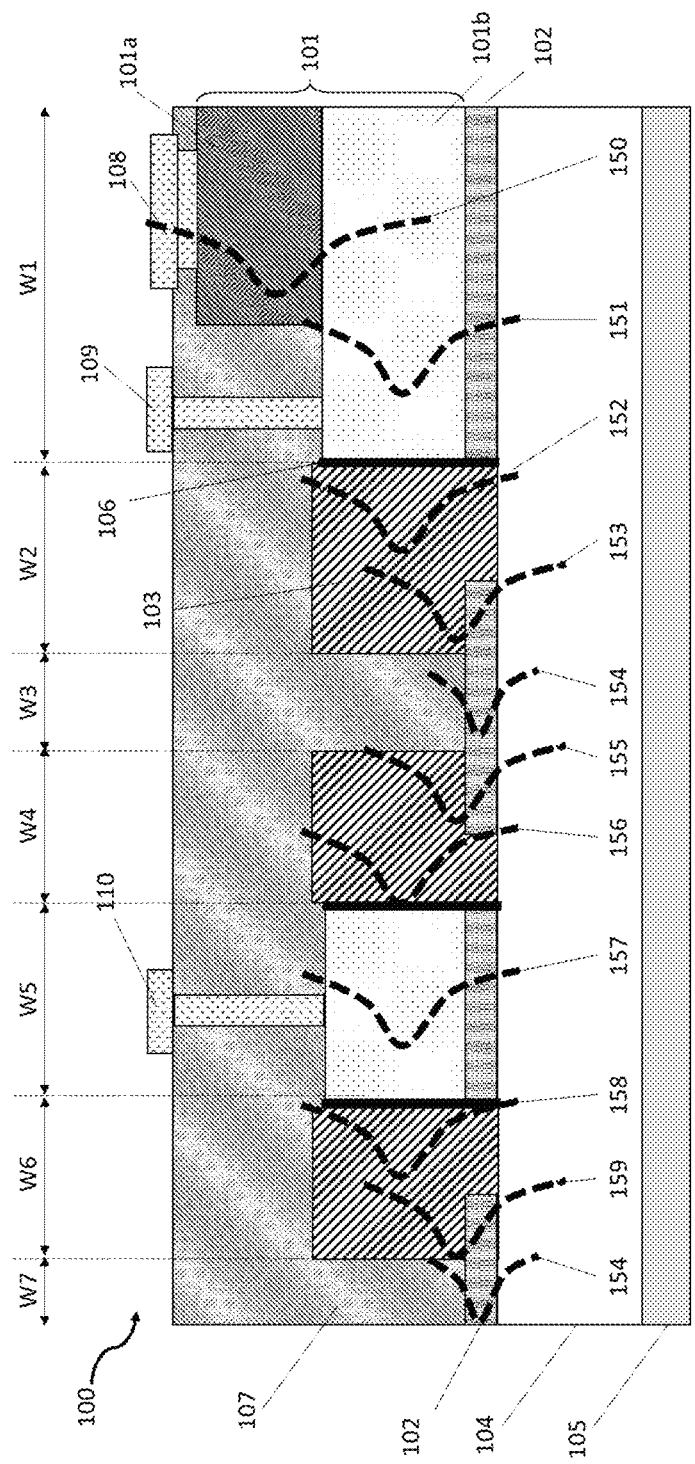
FIG. 1 illustrates a cross-sectional side view of a device according to some embodiments of the present invention.

Described herein are embodiments of a method and system for realization of photonic integrated circuits using wafer bonding and deposition of dissimilar materials where optical coupling is improved by use of mode conversion and a butt-coupling scheme and where an active layer, comprising two or more sub-layers, exists as two or more functional sub-regions, separated longitudinally, along the overall direction in which light signals travel through the PICs. Embodiments described herein are directed to the realization of high-performance modulators integrated with lasers in photonic integrated circuits, providing improved performance and additional functionality over currently available devices.

Spatially distributed active functionalities are used in the present invention to manipulate optical mode characteristics (such as phase) as the optical wave passes through one or more parts of the PICS.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

The description may use perspective-based descriptions such as top/bottom, left/right, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are connected between the elements that are said to be coupled with each other. The term "directly coupled" means that two or more elements are in direct contact in at least part of their surfaces. The term "butt-coupled" is used herein in its normal sense of meaning an "end-on" or axial coupling, where there is minimal or zero axial offset between the elements in question. The axial offset may be, for example, slightly greater than zero in cases where a thin intervening layer of some sort is formed between the elements, as described below with regard to element 106, 306, 506 etc.

Terms "active device", "active layer", "active sub-layer or sub-layer", may be used herein. A device or a layer or sub-layer of a device called active carries out one or more functions of light generation, amplification, modulation, and/or detection, and generally has electrical contacts to control said functions by applying voltage and/or current signals. We use the terms active device and active layer or sub-layer interchangeably meaning either one of them and/or both. This is in contrast to "passive device", "passive waveguide" and/or "passive layer" whose principal function is to confine and guide light, and or provide splitting, combining, filtering, isolating, circulating, out-of-plane emission, and/or other functionalities that are commonly associated with passive devices.

Although it would be generally understood by those of skill in the art of optics that that an optical "mode" pertains to the electromagnetic field pattern in space, while the word "field" pertains to the electrical field vector at a particular point, the terms field and mode may occasionally (for convenience) be used interchangeably in this disclosure.

FIG. 1 is a schematic cross-section view of an integrated photonic device 100 utilizing butt-coupling and mode conversion for efficient coupling between materials with dissimilar refractive indices, according to one set of embodiments. The way in which device 100 functions can be most easily understood by considering it to be made up as a linear series of seven waveguide structures, arranged longitudinally along the device along the general direction in which optical signals would travel through it[1]. Beginning on the right-hand side of the figure, first active waveguide structure W1 supports a first optical mode in a first sublayer and a second optical mode in a second sublayer; first intermediate waveguide structure W2, at least partly butt-coupled to W1, supports an intermediate optical mode; first passive waveguide structure W3 supports a passive optical mode; second intermediate waveguide structure W4 at least partly butt-coupled to second active waveguide structure W5 (which supports the second optical mode) supports the intermediate optical mode; third intermediate waveguide structure W6, at least partly butt-coupled to a second end surface of the second active waveguide structure, also supports the intermediate optical mode, which in turn is coupled into second passive waveguide structure W7, also supporting the passive optical mode. The details of optical mode transformation from right to left, and how the arrangement of the various layers and sublayers on a common substrate cooperate for the device to operate as desired will now be described.

[1] This is for exemplary cases in which the PIC essentially functions as a transmitter or source of modulated signals. Other PICs according to the present invention could of course be operational for optical signals travelling in the opposite direction, through a modulator portion, shown on the left, to be received by a photodetector comprising the active waveguide structure shown on the right. Or the photodetector could be replaced with amplifier, or any other configuration of active components needed to provide the desired functionality.

The exemplary cross-section includes a substrate 105 that can be any suitable substrate for semiconductor and dielectric processing, such as Si, InP, GaAs, quartz, silicon-on-insulator or other materials known in the art. In the shown embodiment, a layer of second material 104 is deposited, grown, transferred, bonded or otherwise attached to the top surface of substrate 105 using techniques known in the field. The main purpose of layer 104 is to provide optical cladding for material 102 (to be described below) if such cladding is necessary to form an optical waveguide. Optical waveguides are commonly realized by placing a higher refractive index core between two lower refractive index layers to confine the optical wave. In some embodiments, layer 104 is omitted and substrate 105 itself serves as a cladding.

Layer 102 is deposited, grown, transferred, bonded or otherwise attached to the top of layer 104, or to the top of substrate 105 if layer 104 is not present, using techniques known in the field. The refractive index of layer 102 is higher than the refractive index of layer 104 if present, or, if layer 104 is not present, the refractive index of layer 102 is higher than the refractive index of substrate 105. In one embodiment, the material of layer 102 may include, but is not limited to, one or more of SiN, TiO2, Ta2O5, SiO2, SiOxNy, LiNbO3 and AlN. In some embodiments, other common dielectric materials may be used for layer 102. In other embodiments, a semiconductor material used for layer 102 may include, but not be limited to, one or more of Si, GaAs, AlGaAs, InP, GaN.

Either or both of layers 104 and 102 can be patterned, etched, redeposited, planarized or otherwise processed as is common in the art before layer 101 is bonded on top of the whole or part of the corresponding (104, 102) top surface. In some cases, where 104 is not present, substrate 105 may be patterned. In one embodiment, also as illustrated in FIG. 1, layer 101 is bonded on top of layer 102, but said layer 102 can also be removed prior to bonding or not deposited at all in the area where 101 is then bonded directly to layer 104. Furthermore, in some embodiments, said layer 101 can be bonded directly to layer 105, in which case layers 102 and/or 104 were either removed or were not deposited at all in the area where 101 is bonded directly to layer 105. Said bonding can be direct molecular bonding or can use additional materials to facilitate bonding such as e.g., metal layers, dielectrics, or polymer films as is known in the art.

Figure 2:
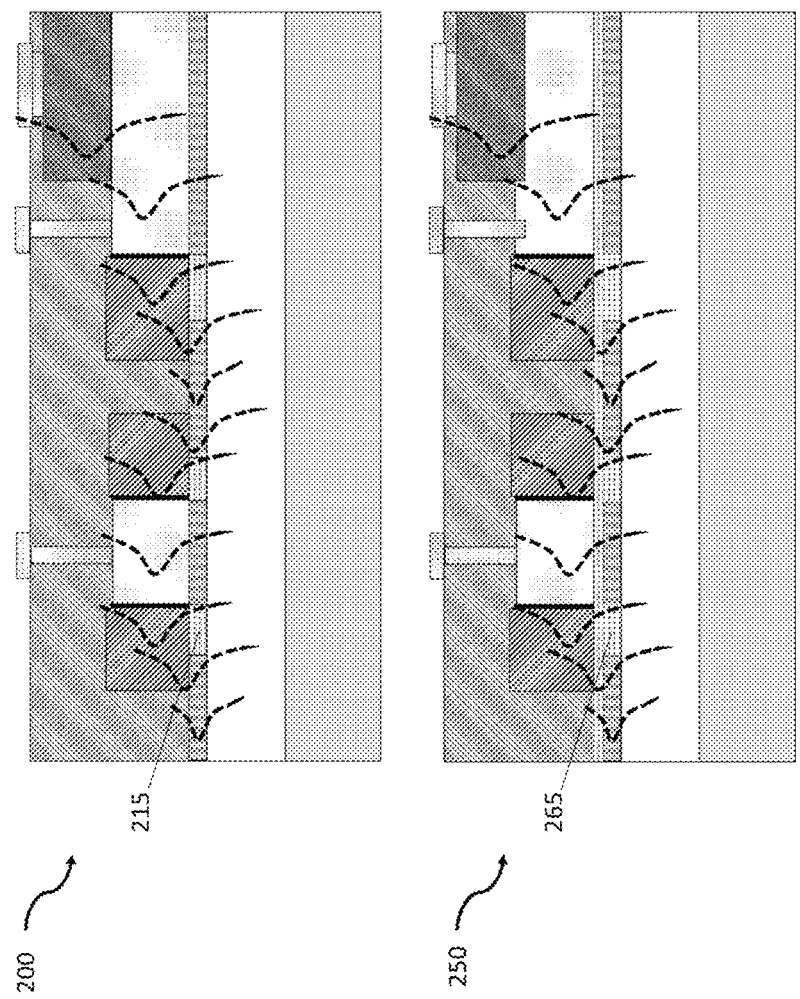
FIG. 2 illustrates two devices according to two of the embodiments corresponding to FIG. 1, shown in cross-section.

In some embodiments, the surface of patterned layers 102 and/or 104 can be planarized prior to bonding layer 101 as shown in FIG. 2, involving the deposition of a layer of material on top. The method of deposition might intrinsically provide a planar top surface (e.g. spin-on material), might be deliberately planarized using process such as CMP and/or planarized using other techniques known in the art.

The planarization might remove the deposited material 215 completely on top of the 102/104 as shown in embodiment 200, or might leave a relatively thin layer of material 265 on top of 102/104 as shown in embodiment 250. The thickness of the remaining thin layer is an optimization parameter and typically ranges between several nanometers to 0.5 µm, but in some embodiments, when utilizing very large optical mode areas, can be significantly thicker up to several µm or more. The material of layer 215 or 265 may include, but is not limited to, one or more of SiN, TiO2, Ta2O5, SiO2, SiOxNy, LiNbO3, AlN, polymers or others. The refractive index of material 215 or 265 is lower than the refractive index of materials 102 and 103.

Returning to FIG. 1, layer 101 may be made up of materials including, but not limited to, InP and InP-based ternary and quaternary materials, GaAs and GaAs based ternary and quaternary materials, GaN, GaP, InAs and InSb and their variations and derivatives. Layer 101 is multilayered, comprising at least two sub-layers (101a and 101b in FIG. 1), each optionally comprising multiple additional sub-layers, which may provide both optical and electrical confinement as well as an interface for electrical contacts, as is known in the art for active devices. In yet another embodiment, layer 101 uses lower layers 102, 104 and/or 105 to provide electrical and/or optical confinement and/or one or more electrical contacts (not shown). The two sub-layers 101a and 101b are optimized to provide specific active functionality. In some embodiments, sub-layer 101a can be efficiently electrically pumped to generate optical emission and gain. In some embodiments, sub-layer 101b can provide efficient phase and/or amplitude modulation.

The present invention enables efficient optical coupling between waveguides formed in layer 101 and layer 102. An optical mode, starting from the right side of the figure, is largely contained in layer 101, where layer material composition and waveguide geometry can control and adjust the relative degrees of confinement in sub-layer 101a vs. sub-layer 101b. In one embodiment, more than 50% of the optical mode resides in sub-layer 101a as suggested by mode profile 150. Mode profile 150 can be efficiently coupled to mode profile 151 by designing appropriate tapers or angled interfaces, as the refractive indices of sub-layers 101a and 101b are similar (refractive indices typically differ by less than 1, and in certain embodiments the difference is significantly less than 0.2).

Efficient coupling between mode profiles 151 and 154 is more challenging as sub-layer 101b and layer 102 typically have a difference in refractive index larger than 1. In certain embodiments the difference is smaller, but still larger than 0.2. In the case of using inverse tapers to form the transition, the requirements on taper tip dimensions become prohibitive limiting efficient power transfer with common tools and techniques. This is especially true if sub-layer 101b thickness is greater than 200 nm or more.

To improve the coupling efficiency between mode profiles 151 and 154, we introduce layer 103. Layer 103 serves as an intermediate waveguide that in some embodiments efficiently accepts the profile (depicted by dashed line 151) of an optical mode supported by the waveguide for which sub-layer 101b provides the core, captures it efficiently as mode profile 152, and gradually transfers it to mode profiles 153, and finally 154. Mode profile 154 is then efficiently coupled to the waveguide for which layer 102 provides the core.

Up to this point, device 100 of the present invention operates in essentially the same way as device 100 described in co-pending U.S. patent application Ser. No. 16/600,349 referenced above. From here, however, light is passed through waveguide structures W4 through W7, to achieve additional functionality.

The sequence by which light in optical mode 151 (supported by a waveguide whose core is in the part of sub-layer 101b in waveguide structure W1) is transferred to optical mode 152 (in waveguide structure W2) and then (via 153) to optical mode 154 (in a waveguide for which layer 102 provides the core in passive waveguide structure W3), is reversed, such that light in mode 154 is gradually transferred to mode profiles 155 and then 156 in waveguide structure W4, then efficiently coupled to mode 157 (supported by a waveguide whose core is in the part of sub-layer 101b) in waveguide structure W5, and finally transitions through modes 158 and 159 in W6 to mode 154 supported by a waveguide for which layer 102 provides the core in waveguide structure W7.

The refractive index and geometry of layer 103 can be engineered to facilitate efficient coupling of mode profile 151 and to efficiently transform the mode to one with mode profile 154 by taking advantage of tapered structures made in layer 102 and/or 103. In the absence of intermediate layer 103, described herein and in U.S. application Ser. No. 16/254,883 referenced above, the requirements on taper tip width would be, as discussed above, problematic. The use of intermediate layer 103, however, significantly reduces the stringent requirements on taper tip width, allowing efficient transfer between high refractive index materials in layer 101b to low refractive index materials in layer 102. Layer 103 may comprise a dielectric, polymer and/or any other suitable material.

Differences between the optical modes supported by waveguides in sub-layers 101a/101b and layer 102 respectively may or may not be obvious by observation of the mode profiles, but mode overlaps less than 100% could (in the absence of intermediate layer 103) result in significant optical loss. In some cases, it may be considered that losses of up to 1 dB are acceptable, but losses greater than that are not. In other cases, a 3 dB or 6 dB loss level may be the criterion chosen. The function of layer 103 is to keep optical loss due to imperfect optical field overlap below whatever is determined to be an acceptable level in a given application.

The upper cladding layer 107 for waveguides realized in 103 and/or 102 can be ambient air (meaning no cladding material is actually deposited) or can be any other deliberately deposited suitable material as shown in FIG. 1, including, but not limited to, a polymer, SiO2, SiN, SiOxNy, etc. Said upper cladding 107 can also be used as cladding material for layers 101b and 101a. In certain embodiments, the multilayered 101a and 101b comprise cladding. Said cladding 107 can be continuous between layers 102, 103 and/or 101, but can also be deposited in parts with different materials. Electrical contacts, three of which 108, 109 and 110 are shown in this sideview but more are typically used, provide current or voltage control interfaces for active layers 101a and 101b. Contacts are designed in such way that interaction between the optical mode and metal is minimized as is known in the art. This can be done by controlling the optical confinement and/or offsetting the contacts from the center of the mode in plane perpendicular to FIG. 1.

Said transition between e.g. mode profiles 151 and 154 is facilitated by layer 103, and, in cases where layer 106 is present, by layer 106. Optional layer 106 primarily serves as either an anti-reflective or a highly-reflective coating at the interface between layer 101b and layer 103. Other interfaces can also utilize coatings to control transmission and/or reflection between different layers.

Layer 101 comprises at least two sub-layers 101a and 101b, each of which can comprise pn-junctions with or without one or more intrinsic regions, quantum-well regions, quantum-dot regions, carrier confinement regions, and/or optical confinement regions or other regions commonly used in active optical semiconductor devices. In one embodiment, sub-layer 101a comprises a typical laser epitaxial structure including a p-contact on top and an n-contact on bottom. Said n-contact is shared with sub-layer 101b and there is a second p-contact on the bottom of sub-layer 101b for controlling the functionality of sub-layer 101b. In yet another embodiment, the layer structure is inverted so instead of a p-n-p structure, an n-p-n structure is used. In yet another embodiment, each of sub-layers 101a and 101b comprises its own separate pn junction structure.

After layer 102 has been grown or deposited on substrate 105 (with or without optional intervening layer 104) and patterned if necessary, to form a "102" structure, a layer 101 (itself comprising sub-layers 101a and 101b) is bonded in a single step to the "102" structure[2]. No precise alignment is required for this bonding step. All subsequent processing steps that do require precise alignment between layers forming cladding, core, contacts etc are carried out using lithographic marks, as discussed below.

[2] In some other cases, as discussed above in this disclosure, the bonding may occur directly to 104 or 105.

The "101" structure is designed to facilitate transfer from a mode that dominantly resides in sub-layer 101a to one that dominantly resides in sub-layer 101b, where the materials of sub-layers 101a and 101b are chosen such that the refractive indices are very close, so selectively etching at least part of sub-layer 101a can readily create a suitable waveguide geometry—a gentle taper—that allows efficient mode transfer to be achieved. It is clear to one skilled in the art that additional sub-layers and transitions in layer 101 can be introduced without departing from the spirit of invention.

Multiple functionalities can therefore be realized with the single bonding step described above, but in addition, different active materials can be bonded in parts on places where other active functionality is needed. In some embodiments different types of active layers in the form of other "101" structures can be bonded onto the same substrate 105 and be co-processed in parallel or sequentially. One or more lithography alignment marks (not shown in this cross-sectional view, but see, for example, 320 in FIG. 3 or 620 in FIG. 6 described below) are present to facilitate precise alignment between the layers formed during subsequent processing steps.

Figure 3:
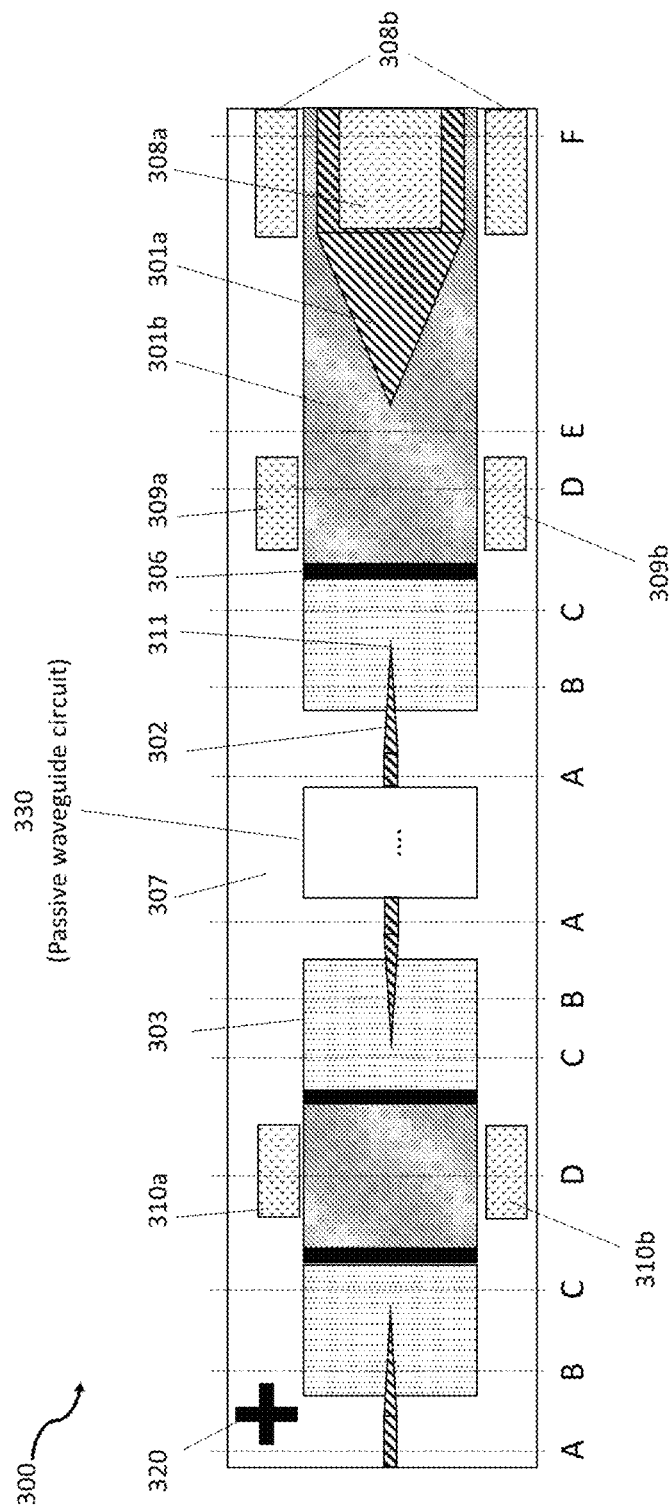
FIG. 3 illustrates a cross-sectional top-down view of a device according to some of the embodiments corresponding to FIG. 1.
Figure 4:
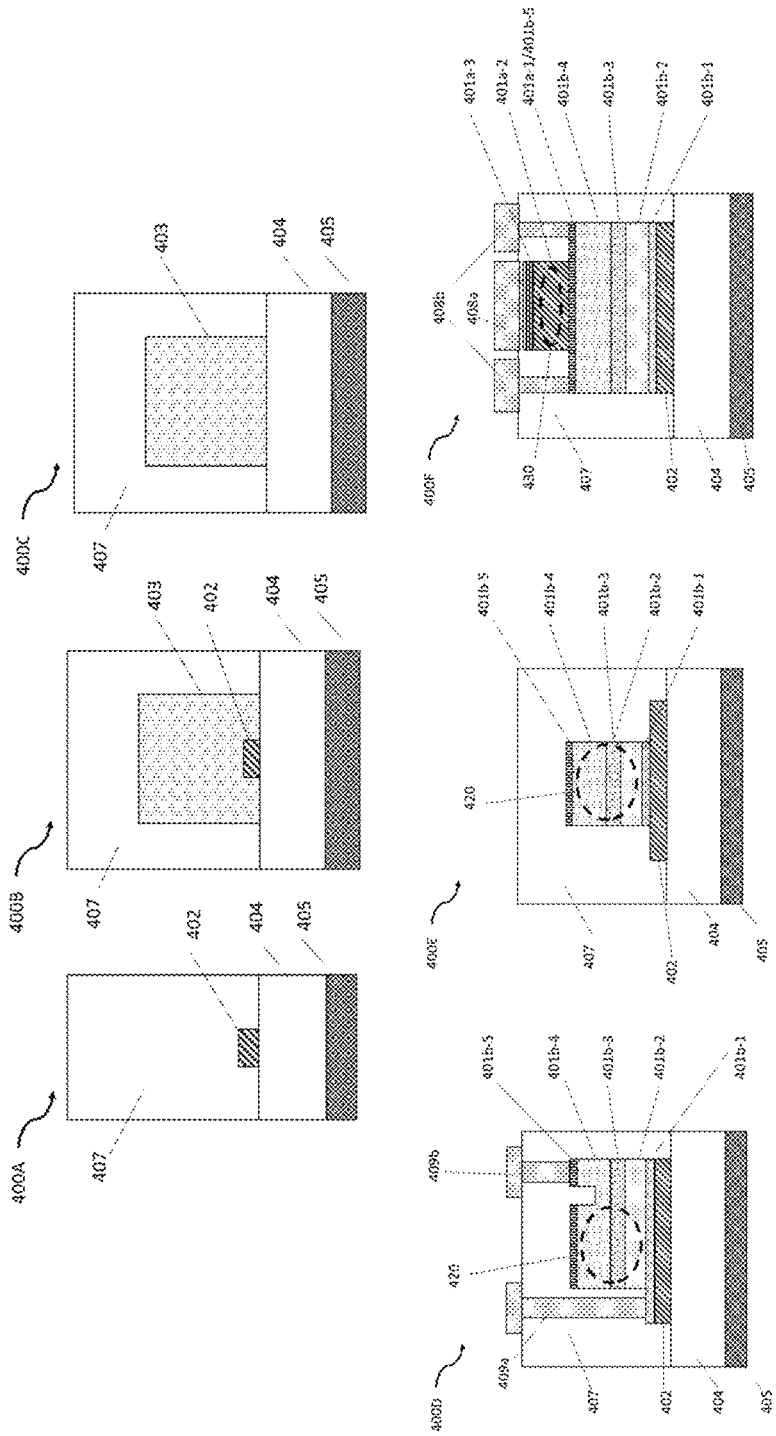
FIG. 4 illustrates cross-sectional end-on views of the device of FIG. 3.

FIG. 3 offers a top-down view of a device 300 according to some of the FIG. 1 embodiments of the present invention, and FIG. 4 shows several corresponding end-on cross-sectional views 400A, 400B, 400C, 400D, 400E, and 400F of that device.

The top-down view of device 300 shows optional upper cladding layer 307 that covers optional lower cladding layer 304 and substrate 305 (neither of which is visible in this view, but they are both shown in views 400A-400F). The optical mode supported by "active" layer is guided from one dominantly residing in active sub-layer 301a, through appropriate taper and/or transition structure to an optical mode dominantly residing in sub-layer 301b. That taper structure can be an inverse taper as shown in view 300, can be just an abrupt termination, an angled surface or any other transition that provides desired ratios of transmission and reflection. Said interface can be coated (not shown) to further control the transmission and reflection ratios. A mode efficiently guided by sub-layer 301b is transformed to a mode efficiently guided by layer 302. Said transition can be optimized by adjusting the angle of the interface between 301b and 303 to control reflection and transmission, and/or by depositing an optional coating 306 as described below in relation to FIG. 8. The refractive index of the mode dominantly residing in 303 is smaller than the refractive index of the mode dominantly residing in 301b and coupling is facilitated by optimizing the waveguide cross-sections for butt-coupled transmission with no taper structures. Taper structures would be ineffective as the difference in refractive indices is large, typically larger than 1. In certain embodiments the difference is smaller, but still larger than 0.2. Instead of tapering, the height and/or width of either or both of 303 and 301b may be adjusted to maximize the coupling. In some cases, as in the embodiment shown in FIG. 1, where 103 and 101b differ in either height or width, a slight axial offset between 103 and 101b will be present, meaning the butt-coupling may be termed "partial" rather than "full".

Layer 303 primarily serves to convert the mode for efficient coupling from layer 301b to layer 302. To facilitate that coupling, the dimensions of layer 302 are tapered down towards layer 301a, as indicated by the relatively small width of the tip 311 relative to the width of layer 302 shown at the extreme left of the figure. It has been calculated that the requirements on taper dimensions are significantly relaxed up to several hundred nanometers due to the presence of layer 303. For example, a coupling efficiency between 301b and 302 of greater than 50% may be achieved, even if the refractive index difference between 301b and 302 is larger than one, for a tip width of a few hundred nanometers. In contrast, in the absence of layer 303, where layer 301b has to be tapered such that its mode may directly couple into layer 302, the dimensions of taper tip would have to be much less than one hundred nanometers for a similar coupling efficiency. In another embodiment, a taper is created in layer 303 instead of in layer 302. In yet another embodiment, tapers may be created in both layers 302 and 303 for highly efficient coupling.

In some embodiments (not shown), the taper tip can physically touch layer 306, or layer 301b if layer 306 is not present. In yet another embodiment (not shown), the tapering of layer 302 extends over the full length of layer 301a (to the right in the orientation shown in the figure) so that there is no abrupt termination, but the width variation continues to facilitate more efficient coupling.

Once mode has transitioned to the waveguide for which layer 302 provides the core, additional passive functionalities inside the block 330 passive waveguide circuit can be realized such as power splitting/combining, filtering, thermal phase tuning, coupling to fiber, coupling to other PICs and/or others. There can be one or more 330 passive waveguide circuit regions (only one is shown in FIG. 3).

Six electrical contacts 308a, 308b, 309a, 309b, 310a and 310b are shown. In one embodiment contacts 308a and 308b are used for vertically injected laser structure formed in layer 301a, contacts 309a and 309b are used for laterally and/or vertically injected active structure in layer 301b that is integrated as a part of same structure as layer 301a, and contacts 310a and 310b are used for laterally and/or vertically injected active structure in layer 301b that is integrated as a separate structure that is optically coupled via layer 302 to active structure utilizing electrical contacts 308a, 308b, 309a and/or 309b as shown in 300. Contacts are designed in such way that interaction between the optical mode and metal is minimized as is known in the art. This can be done by controlling the optical confinement and/or offsetting the contacts from the center of the mode as suggested in 400, 400D and 400F.

In some embodiments (not shown) there is no active structure using contacts 310a and 310b; in some embodiments (not shown) the active structure using contacts 309a and 309b is used only for facilitating efficient mode transfer, and not for active functionality.

One or more lithography alignment marks 320 (only one is shown for simplicity) are used for precise alignment between layers formed in various processing steps.

Cross-sectional views 400A, 400B, 400C, 400D, 400E, and 400F correspond to six characteristic locations marked A, B, C, D, E and F in the top-down view of FIG. 3. Cross-sections 400D-400F show an exemplary cut through a region that comprises at least one of sub-layers 301a and 301b of layer 301. In the embodiments shown in cross-sectional views in FIG. 4, layer 401 comprises two active sub-regions 401a and 401b, each comprising one or more sub-layers. In other embodiments (not shown) the number of active sub-region may be three or more. Cross sections 400A-400F show layers 402 and optional layer 404 deposited on top of substrate 405 (as described with regard to 102, 104 and 105 in relation to FIG. 1. In embodiments where layer 402 does not terminate before layers 306 (shown in FIG. 3), of course view 400C would not be found.

Cross-section 400A shows a region where mode is residing inside the waveguide for which layer 402 provides the core and can implement various functionalities as described in relation to FIG. 3 and element 330.

Cross-section 400B shows a region where the tapered transition between layers 403 and 402 is formed. In some embodiments (not shown), layer 403 is tapered. In yet another embodiment (not shown), both layers 402 and 403 are tapered. As discussed above, the requirements on taper tip dimensions are significantly reduced due to the mode conversion carried out by layer 403. Typical heights and widths of waveguides 401 (comprising at least one of the sub-regions 401a, 401b), 402, and 403 can range from submicron to several microns, although they are largely dependent on specific material systems and implementations. In some embodiments, the thickness of layer 401b is greater than 200 nm. Optional upper cladding layer 407 is shown in all views 400A-400F.

Cross-section 400C shows a region where mode is guided by the waveguide for which layer 403 provides the core, with dimensions of the core 403 optimized to facilitate efficient coupling to the mode supported by waveguides 401.

View 400D shows a region in which modulator is implemented, including additional details on providing optical guiding and electrical contacts. Sub-layer 401b comprises multiple layers, each of which can have functional sub-regions. At least two layers provide efficient metal contact, top contact 401b-5 and bottom contact 401b-1. 401b-5 is a top contact layer, typically highly doped (>1e18), that can be shared with bottom laser contact layer (to be described later with the help of 400F). Bottom contact 401b-1 can be a single highly doped (>1e18), layer providing the contact and/or can comprise additional sub-layers such as a superlattice commonly used when bonding materials. 401b-2 is a modulator bottom cladding layer that is typically doped, but at lower concentration than the bottom contact 401b-1 layer. It is fully etched on at least one side to expose 401b-1 to form at least one of the 409a contacts. To facilitate better process uniformity, layer 401b-2 can comprise thin etch stop layers. 401b-3 is the active modulation layer, that has a low level of doping; in some embodiments, the doping is deliberate, in others it is an unintentionally doped (UID) layer. The active region, the predominate site of interactions between photons and electrons and/or the electrical field, comprises bulk, quantum well (QW) and/or quantum dot (QD) material. Active modulation layer 401b-3 is fully etched on at least on side to expose 401b-1 to form at least one of the 409a contacts. 401b-4 is modulator top cladding that is typically doped, but at lower concentration than the top contact 401b-5 layer. Modulator top cladding 401b-4 is fully etched on at least one side to expose 401b-1 to form at least one of the 409a contacts. In some embodiments, and also as shown in 400D, modulator top cladding 401b-4 is partially etched on one side to form the waveguide, said partial etch control can be facilitated by incorporating thin etch stop layer.

The combination of particular layers (401b-1 to 401b-5) refractive indices, together with combination of full and partial etches is used to control the optical mode 420 and the confinement of said optical mode 420 inside the modulator active region 401b-3. Control signals are applied through metal contacts 409a and 409b to provide phase modulation, intensity modulation and/or both.

View 400E shows a region in which waveguide is implemented in sub-region 401b, but does not comprise electrical contacts. Such region can be used for facilitating more efficient transmission to cross-section 400C, can be used as a facet to couple to fiber and/or free-space allowing for highly confined and/or symmetric mode size, and/or can provide efficient non-linear functionality (high optical field intensities due to low effective area as the index contrast between the core and cladding can be high). The functional layers and sub-layers are described in relation with view 400D, but in the region 400E layers 401b-1 to 401-b5, if etched, are etched on both sides to provide a symmetric structure and symmetric optical mode. In the embodiment shown in view 400E, all sub-layers of 401b are etched. Other etch depths can be utilized, and some layers might be partially etched.

View 400F shows a region in which optical gain is implemented, including additional details on providing optical guiding and electrical contacts. Sub-region 401b comprises multiple layers, each of which can have functional sub-layers and are described in relation to view 400D and modulator implementation. Said layers are not functionally used in view 400F, with the optical mode largely residing in the sub-region 401a comprising at least two contact layers 401a-1 and 401a-3. In some embodiments, and as shown in view 400F, layer 401a-1 can be shared with layer 401b-5, and form a shared electrical contact between the gain and modulator regions. In other embodiments, gain and modulator have separate electrical contacts as described in relation to FIG. 1 and layer 101.

Layer 401a-2 comprises multiple sub-layers to form the gain region. Typically gain region comprises of active region comprising QW and/or QD, separate confinement heterostructure (SCH) regions and/or waveguide/cladding regions as is known to one skilled in the art of semiconductor active devices. Layer 401a-2 can be formed with multiple etches to optimize laser efficiency and performance, and might comprise etch stop layers to improve the process uniformity. The optical mode 430 dominantly residing in layer 401a-2 can be efficiently transformed to the optical mode 420 dominantly residing in layer 401b as described in relation to FIG. 1 and modes 150 and 151. Additional layers, doped or un-doped, can be introduced to facilitate ease of manufacturing, improve the performance or otherwise enhance the device.

Figure 5:
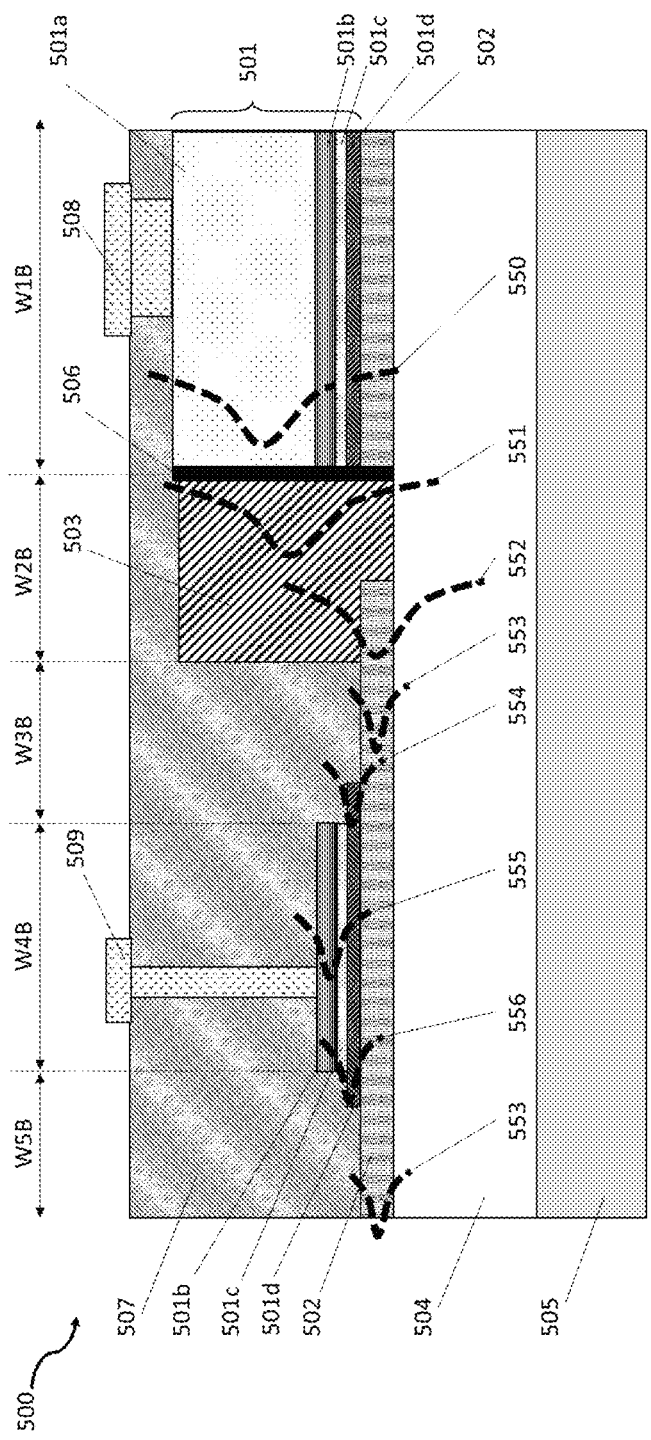
FIG. 5 illustrates a cross-sectional side view of a device according to some other embodiments of the present invention.

FIG. 5 is a schematic cross-section side view of an integrated photonic device 500 utilizing butt-coupling and mode conversion for efficient coupling between materials with dissimilar refractive indices, according to another set of embodiments. The way in which device 500 functions can be most easily understood by considering it to be made up as a linear series of five waveguide structures, arranged longitudinally along the device along the general direction in which optical signals would travel through it[3]. Beginning on the right-hand side of the figure, first active waveguide structure W1B supports a first optical mode in a first sublayer[4]; intermediate waveguide structure W2B, at least partly butt-coupled to W1B, supports an intermediate optical mode; first passive waveguide structure W3B supports a passive optical mode; second active waveguide structure W4B supports the second optical mode; and finally second passive waveguide structure W5B also supporting the passive optical mode. The details of optical mode transformation from right to left, and how the arrangement of the various layers and sublayers on a common substrate cooperate for the device to operate as desired will now be described.

[3] As discussed above with respect to FIG. 1, the device shown in FIG. 5 could also operate on optical signals traveling in the reverse direction, to be received by a photodetector in waveguide structure W1B, rather than originating there. Or the photodetector could be replaced with amplifier, or any other configuration of active components needed to provide the desired functionality.

[4] A second sublayer underlying the first would be capable of supporting a second optical mode only in the absence of the first sub-layer, so that second optical mode is not supported in W1B but is supported in the second sub-layer in W4B, as discussed in the body of the paragraph, and shown in FIG. 5.

The functional layers 502, 503, 504, 505, and 507 provide equivalent functionality to layers 102, 103, 104, 105, and 107 respectively as described in more detail with the help of FIG. 1.

Similarly, as described in relation to FIG. 1 and FIG. 2, the patterned layers 502 and/or 504 can be planarized prior to bonding including leaving a relatively thin layer of material used for planarization.

Layer 501, an active layer, may be made up of materials including, but not limited to, InP and InP-based ternary and quaternary materials, GaAs and GaAs based ternary and quaternary materials, GaN, GaP, InAs and InSb and their variations and derivatives. Layer 501 is multilayered, comprising at least two functional sub-layers. In the embodiment shown in FIG. 5, one sub-layer 501a, provides optical gain, and another set of sub-layers 501b, 501c and 501d provide modulator functionality. Each of the sub-layers 501a through 501d can optionally comprise multiple additional sub-layers, which may provide both optical and electrical confinement as well as an interface for electrical contacts, as is known in the art for active devices.

The present invention enables efficient optical coupling between waveguides formed in layer 501 and layer 502. An optical mode, starting from the right side of the figure, is largely contained in layer 501, where layer material composition and waveguide geometry can control and adjust the relative degrees of confinement in sub-layer 501a vs. other sub-layers (501b, 501c and 501d). In one embodiment, more than 50% of the optical mode resides in sub-layer 501a as suggested by mode profile 550.

Efficient coupling between mode profiles 550 and 553 is challenging as layer 501 and layer 502 typically have a difference in refractive index larger than 1. In certain embodiments the difference is smaller, but still larger than 0.2. In the case of using inverse tapers to form the transition, the requirements on taper tip dimensions become prohibitive limiting efficient power transfer with common tools and techniques. This is especially true if layer 501 thickness is greater than 200 nm or more.

To improve the coupling efficiency between mode profiles 550 and 554, we introduce layer 503. Layer 503 serves as an intermediate waveguide that in some embodiments efficiently accepts the profile (depicted by dashed line 551) of an optical mode supported by the waveguide for which layer 501 provides the core, captures it efficiently as mode profile 551, and gradually transfers it to mode profiles 552, and finally 553. Mode profile 553 is then efficiently coupled to the waveguide for which layer 502 provides the core. It is understood that mode transition can also proceed in opposite direction, converting the initial mode 553 to mode 550.

The refractive index and geometry of layer 503 can be engineered to facilitate efficient coupling of mode profile 551 and to efficiently transform the mode to one with mode profile 553 by taking advantage of tapered structures made in layer 502 and/or 503. In the absence of intermediate layer 503, described herein and in U.S. application Ser. No. 16/254,883 referenced above, the requirements on taper tip width would be, as discussed above, problematic. The use of intermediate layer 503, however, significantly reduces the stringent requirements on taper tip width, allowing efficient transfer between high refractive index materials in layer 501 to low refractive index materials in layer 502. Layer 503 may comprise a dielectric, polymer and/or any other suitable material.

Differences between the optical modes supported by waveguides in layer 501 and layer 502 respectively may or may not be obvious by observation of the mode profiles, but mode overlaps less than 100% could (in the absence of intermediate layer 503) result in significant optical loss. In some cases, it may be considered that losses of up to 1 dB are acceptable, but losses greater than that are not. In other cases, a 3 dB or 6 dB loss level may be the criterion chosen. The function of layer 503 is to keep optical loss due to imperfect optical field overlap below whatever is determined to be an acceptable level in a given application.

Sub-layers 501b, 501c and 501d provide the modulator functionality, and are characterized by thicknesses that are less than 200 nm, and in some embodiments less than 100 nm. The low thicknesses of these sub-layers (501b, 501c, 501d) enable efficient coupling using tapered structures without needing to have intermediate waveguide structures to facilitate transformation between modes 553 supported by the passive waveguide formed in layer 502, and mode 555 supported by the waveguide dominantly formed inside sub-layers 501b, 501c and 501d. This is why embodiments of the type illustrated in FIG. 5 have only one intermediate waveguide structure rather than the three shown in FIG. 1. To enhance the coupling efficiency and relax the requirements on taper tip widths, dual layer tapers can be utilized in which mode 553 is first transformed to mode 554 using a taper in sub-layer 501d (where sub-layers 501c and 501b are removed), and then transformed to mode 555 using a taper in sub-layers 501c and 501b. Similarly, using first the taper in layers 501c and 501b and then the taper in 501d, mode 555 can be efficiently transformed to mode 556 and finally mode 557. Sub-layer 501d in which the first taper is realized, has a thickness that is only a small fraction of total thickness (501b, 501c and 501d) used to provide modulator functionality.

Electrical contacts, such as 508 and 509 shown in this side view (but note that more are typically used) provide current or voltage control interfaces for active layers. Contacts are designed in such way that interaction between the optical mode and metal is minimized as is known in the art. This can be done by controlling the optical confinement and/or offsetting the contacts from the center of the mode in plane perpendicular to FIG. 1.

Said transition between e.g. mode profiles 550 and 553 is facilitated by layer 503, and, in cases where layer 506 is present, by layer 506. Optional layer 506 primarily serves as either an anti-reflective or a highly-reflective coating at the interface between layer 501 and layer 503. Other interfaces can also utilize coatings to control transmission and/or reflection between different layers.

Layer 501 comprises at least two sub-regions, each of which can comprise pn-junctions with or without one or more intrinsic regions, quantum-well regions, quantum-dot regions, carrier confinement regions, and/or optical confinement regions or other regions commonly used in active optical semiconductor devices. After layer 502 has been grown or deposited on substrate 505 (with or without optional intervening layer 504) and patterned and/or planarized if necessary, to form a "502" structure, a layer 501 (itself comprising sub-layers 501a, 501b, 501c and 501d) is bonded in a single step to the "102" structure. No precise alignment is required for this bonding step. All subsequent processing steps that do require precise alignment between layers forming cladding, core, contacts etc. are carried out using lithographic marks, as discussed below. It is clear to one skilled in the art that additional sub-layers in layer 501 can be introduced without departing from the spirit of invention.

Multiple functionalities can therefore be realized with the single bonding step described above, but in addition, different active materials can be bonded in parts on places where other active functionality is needed. In some embodiments different types of active layers in the form of other "501" structures can be bonded onto the same substrate 505 and be co-processed in parallel or sequentially. One or more lithography alignment marks (not shown in this cross-sectional view, but see, for example, 320 in FIG. 3 or 620 in FIG. 6 described below) are present to facilitate precise alignment between the layers formed during subsequent processing steps.

Figure 6:
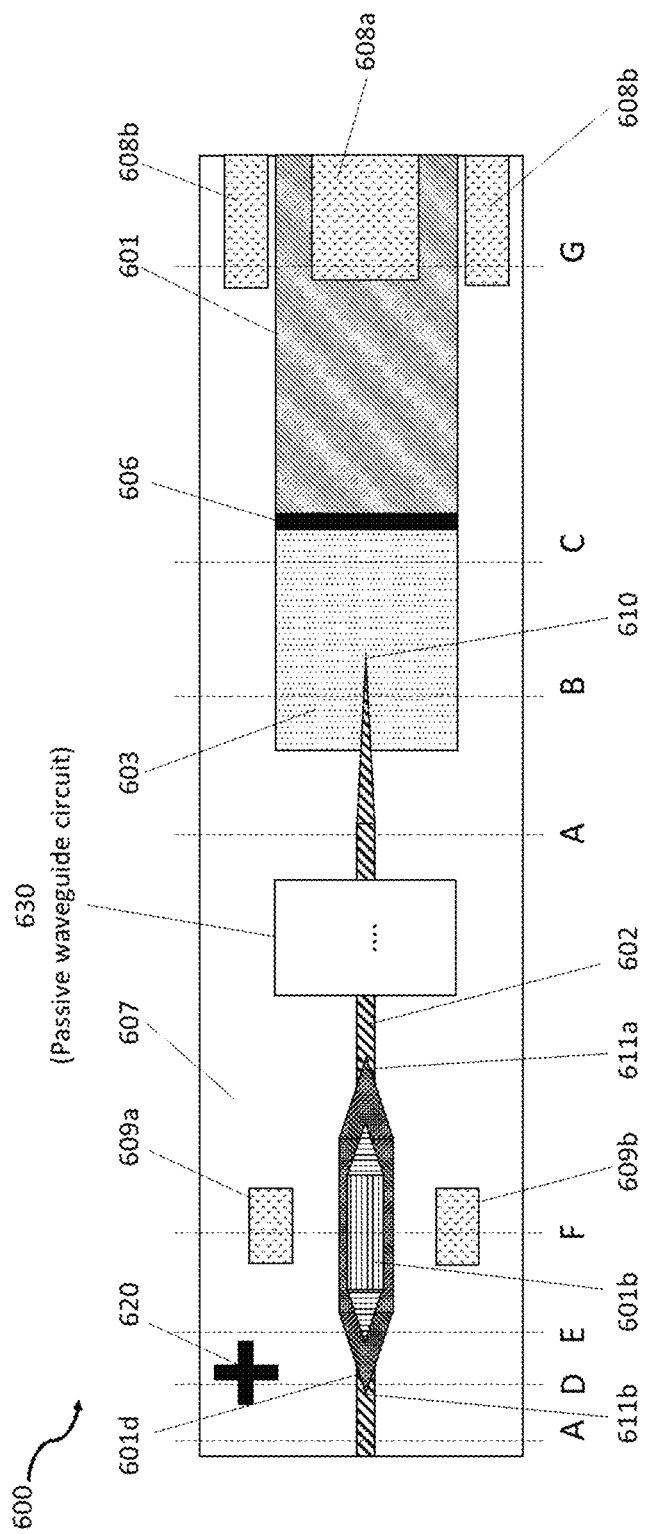
FIG. 6 illustrates a cross-sectional top-down view of a device according to some of the embodiments corresponding to FIG. 5.
Figure 7:
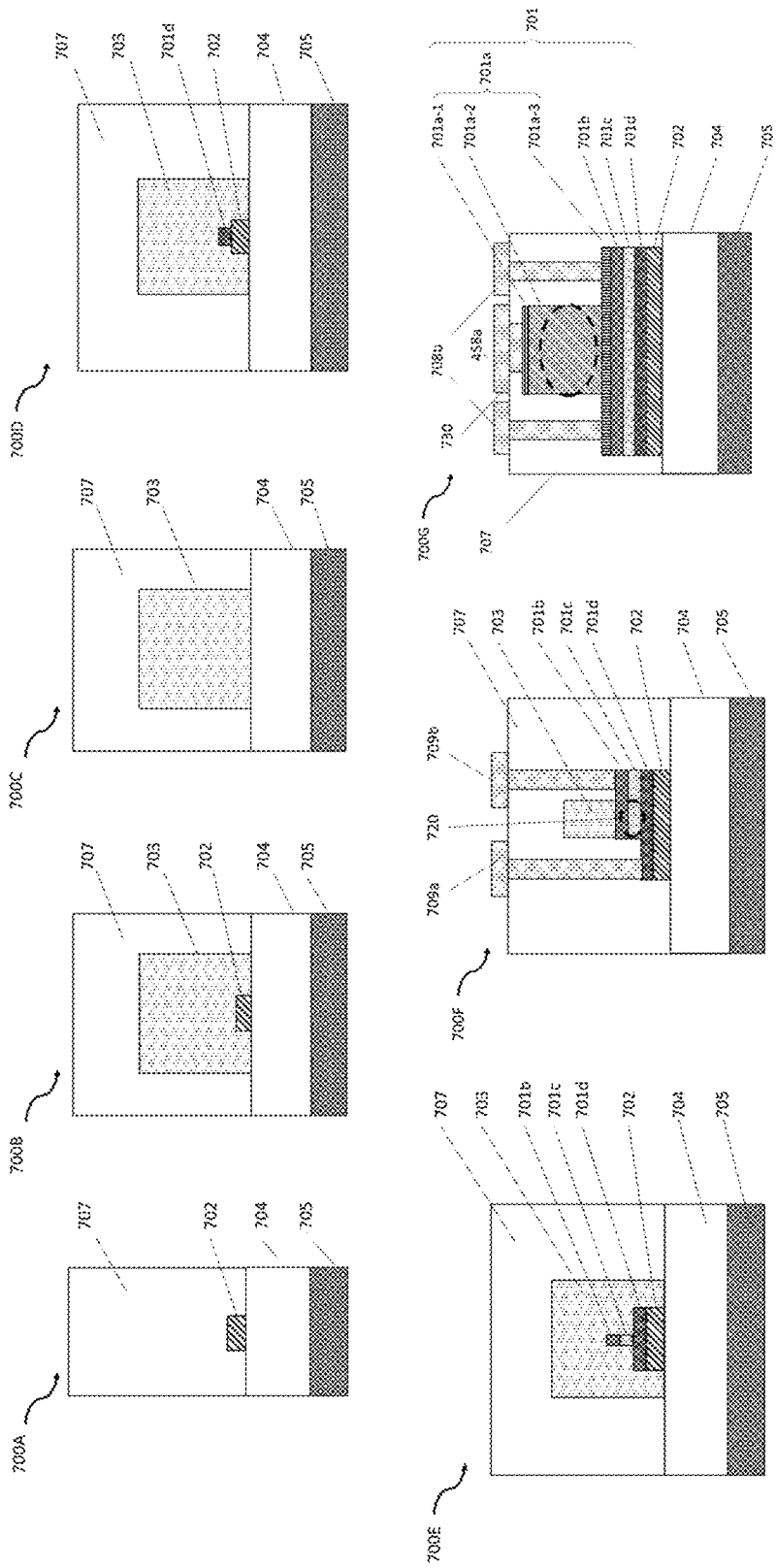
FIG. 7 illustrates cross-sectional end-on views of the device of FIG. 5.

FIG. 6 offers a top-down view of a device 600 according to some of the FIG. 5 embodiments of the present invention, and FIG. 7 shows several corresponding end-on cross-sectional views 700A, 700B, 700C, 700D, 700E, 700F, and 700G of that device.

The top-down view of device 600 shows optional upper cladding layer 607 that covers optional lower cladding layer 604 and substrate 605 (neither of which is visible in this view, but they are both shown in views 700A-700G).

A mode efficiently guided by layer 601 (and largely confined in sub-region 701a as will be explained with the help of FIG. 7 and cross-sectional view 700G) is transformed to a mode efficiently guided by layer 602. Said transition can be optimized by adjusting the angle of the interface between 601 and 603 to control reflection and transmission, and/or by depositing an optional coating 606 as described below in relation to FIG. 8. The refractive index of the mode dominantly residing in 603 is smaller than the refractive index of the mode dominantly residing in 601 and coupling is facilitated by optimizing the waveguide cross-sections for butt-coupled transmission with no taper structures. Taper structures would be ineffective as the difference in refractive indices is large, typically larger than 1. In certain embodiments the difference is smaller, but still larger than 0.2. Instead of tapering, the height and/or width of either or both of 603 and 601 may be adjusted to maximize the coupling. In some cases, as in the embodiment shown in FIG. 5, where 503 and 501 differ in either height or width, a slight axial offset between 503 and 501 will be present, meaning the butt-coupling may be termed "partial" rather than "full".

Layer 603 primarily serves to convert the mode for efficient coupling from layer 601 to layer 602. To facilitate that coupling, the dimensions of layer 602 are tapered down towards layer 601, as indicated by the relatively small width of the tip 610 relative to the width of layer 602 shown at the extreme left of the figure. It has been calculated that the requirements on taper dimensions are significantly relaxed up to several hundred nanometers due to the presence of layer 603. For example, a coupling efficiency between 601 and 602 of greater than 50% may be achieved, even if the refractive index difference between 601 and 602 is larger than one, for a tip width of a few hundred nanometers. In contrast, in the absence of layer 603, where layer 601 has to be tapered such that its mode may directly couple into layer 602, the dimensions of taper tip would have to be much less than one hundred nanometers for a similar coupling efficiency. In another embodiment, a taper is created in layer 603 instead of in layer 602. In yet another embodiment, tapers may be created in both layers 602 and 603 for highly efficient coupling.

In some embodiments (not shown), the taper tip can physically touch layer 606, or layer 601 if layer 606 is not present. In yet another embodiment (not shown), the tapering of layer 602 extends over the full length of layer 601 (to the right in the orientation shown in the figure) so that there is no abrupt termination, but the width variation continues to facilitate more efficient coupling.

Once a mode has transitioned to the waveguide for which layer 602 provides the core, additional passive functionalities inside the block 630 passive waveguide circuit can be realized such as power splitting/combining, filtering, thermal phase tuning, coupling to fiber, coupling to other PICs and/or others. There can be one or more 630 passive waveguide circuit regions (only one is shown in FIG. 6).

In some embodiments, the optical mode can then transition into structure realized in only one sub-region of the layer 601, two sub-layers which are shown in FIG. 6 as sub-layers 601b and 601d. Sub-layer 601c is not shown in this view, but is explained in more details as layer 701c in regard to FIG. 7. The combined thickness of sub-layers 601b, 601c and 601d in some embodiments is less than 500 nm. In other embodiments the combined thickness is less than 250 nm. The lesser thickness of said layers (601b, 601c, 601d) enables efficient coupling using tapered structures and adiabatic transformation as suggested by taper tips 611a and 611b. To enhance the coupling efficiency and relax the requirements on taper tip widths, dual layer taper. Said dual layer taper facilitates more efficient adiabatic transformation with reduced requirements on taper tip width, as the thickness of first taper realized in sub-layer 501d is only a fraction of total sub-region thickness facilitating efficient refractive index matching and adiabatic coupling.

Four electrical contacts 608a, 608b, 609a, and 609b are shown. In one embodiment contacts 608a and 608b are used for vertically injected laser structure formed in a sub-region of layer 601 (not shown in FIG. 6, but shown in FIG. 7 view 700G as 701a comprising of 701a-1, 701a-2 and 701a-3). Contacts 309a and 309b are used for laterally and/or vertically injected active structure in another sub-region of layer 601. This sub-region is partly shown in FIG. 6 as sub-layers 501b and 601d, and is shown in more detail in FIG. 7 views 700D, 700E and 700F as sub-layers 701b, 701c, and 701d. Contacts are designed in such way that interaction between the optical mode and metal is minimized as is known in the art. This can be done by controlling the optical confinement and/or offsetting the contacts from the center of the mode as suggested in views 700D, 700E, 700F and 700G.

One or more lithography alignment marks 620 (only one shown for simplicity) are used for precise alignment between layers formed in various processing steps.

Cross-sectional views 700A, 700B, 700C, 700D, 700E, 700F and 700G correspond to seven characteristic locations marked A, B, C, D, E, F and G in the top down view of FIG. 6. Cross-sections 700D-700G show an exemplary cut through a region that comprises at least one of sub-regions of layer 701 comprising multiple sub-layers 701a-1, 701a-2, 701a-3, 701b, 701c and/or 701d. In the embodiments shown in cross-sectional views in FIG. 7, layer 301 comprises two active sub-regions, first comprising sub-layers 701a-1, 701a-2 and 701a-3, and second comprising sub-layers 701b, 701c, and 701d. In other embodiments (not shown) the number of active sub-regions may be three or more. Cross sections 700A-700G show layers 702 and optional layer 704 deposited on top of substrate 705 (as described with regard to 102, 104 and 105 in relation to FIG. 1. In embodiments where layer 702 does not terminate before layers 606 (shown in FIG. 6), of course view 700C would not be found.

Cross-section 700A shows a region where mode is residing inside the waveguide for which layer 702 provides the core and can implement various functionalities as described in relation to FIG. 6 and element 630.

Cross-section 700B shows a region where the tapered transition between layers 703 and 702 is formed. In some embodiments (not shown), layer 703 is tapered. In yet another embodiment (not shown), both layers 702 and 703 are tapered. As discussed above, the requirements on taper tip dimensions are significantly reduced due to the mode conversion carried out by layer 703. Typical heights and widths of waveguides 701 (comprising both sub-regions providing optical gain and modulator functionality), 702, and 703 can range from submicron to several microns, although they are largely dependent on specific material systems and implementations. In some embodiments, the thickness of layer 701 (comprising 701a-1, 701a-2, 701a-3, 701b, 701c and 701d) is greater than 750 nm. Optional upper cladding layer 707 is shown in all views 700A-700F.

Cross-section 700C shows a region where mode is guided by the waveguide for which layer 703 provides the core, with dimensions of the core 703 optimized to facilitate efficient coupling to the mode supported by waveguides formed in 701.

View 700D shows a region in which first taper (611b in FIG. 6) is realized in sub-layer 701d. Sub-layer 701d, providing bottom electrical contact and superlattice functionality (as explained below with the help of view 700F) is only a fraction of complete layer 701 thickness, significantly relaxing the requirements on taper tip width. In one embodiment, the coupling is facilitated by tapering the dimensions of sub-layer 701d as also shown in FIG. 6. In other embodiments, tapers are created in layer 702 instead of layer 701d (not shown). In yet another embodiment, tapers may be created in both layers 702 and 701d for highly efficient coupling.

View 700E shows a region in which second taper (611a in FIG. 6) is realized in sub-layers 701b and 701c. Sub-layers 701b and 701c functionality, as related to modulation of optical signal, is described in more details below with the help of view 700F. As the optical mode has partly transitioned to region defined by layers 702 and 701d with higher effective refractive index (due to higher refractive index of sub-layer 701*d*), the coupling to thicker region comprising all of the layers 702, 701*d*, 701*c* and 701*b* utilizing tapered structures is significantly relaxed. In one embodiment, the coupling is facilitated by tapering the dimensions of sub-layers 701*b* and 701*c* as also shown in FIG. 6. In other embodiments, tapers are created in layers 702 and 701*d* instead of layers 701*b* and 701*c* (not shown). In yet another embodiment, tapers may be created in both groups of layers with group one comprising 702 and 701*d* and group two comprising 701*b* and 701*c*.

View 700F shows a region in which modulator is implemented, including additional details on providing optical guiding and electrical contacts. At least two layers provide efficient metal contact, top contact 701*b* and bottom contact 701*d*. 701*b* is a top contact layer, typically highly doped (>1e18), that can be shared with bottom laser contact layer. Bottom contact 701*d* can be a single highly doped (>1e18), layer providing the contact and/or can comprise additional sub-layers such as a superlattice commonly used when bonding materials. 701*c* is a thin modulator layer that has low level of doping or is, what is commonly known, UID layer (unintentionally doped). The active region of thin modulator layer 701*c* can be bulk, quantum well (QW) and/or quantum dot (QD). Both layers 701*b* and 701*c* are fully etched on at least one side to expose 701*d* to form at least one of the 709*a* contacts. This etching serves to control the optical mode 720 shape, interaction between the optical mode and electric field/carriers, and interaction between the optical mode and metal 709*a* to control optical losses. Contact 709*b* is realized via sub-layer 701*b* which can comprise additional sub-layers to facilitate process control such as etch stops or others. The control of the optical mode 720, including mode shape, interaction between optical mode and electric field/carriers and optical mode and metal 709*b* is further provided with patterned layer 703 providing additional lateral confinement. Control signals are applied through metal contacts 709*a* and 709*b* to provide phase modulation, intensity modulation and/or both.

View 700G shows a region in which optical gain is implemented, including additional details on providing optical guiding and electrical contacts. Layer 701 comprises multiple sub-layers, where 701*b*, 701*c* and 701*d* provide modulator functionality and are described in relation to views 700D, 700E and 700F. Said layers are not functionally used in view 400G, with the optical mode 730 largely residing in the sub-region 701*a* comprising at least two contact layers 701*a*-1 and 701*a*-3, and the active region comprising QW and/or QD separate confinement heterostructure (SCH) regions and/or waveguide/cladding regions as is known to one skilled in the art of semiconductor active devices. In some embodiments, and as shown in view 700G, layer 701*a*-3 is separate from layer 701*b* used to provide electrical contact for the modulator region. In other embodiments (not shown), gain and modulator functionalities can share electrical contact between said regions. Layers 701*a*-1 and 701*a*-2 can be formed with multiple etches to optimize laser efficiency and performance, and might comprise etch stop layers to improve the process uniformity. Additional layers, doped or un-doped, can be introduced to facilitate ease of manufacturing, improve the performance or otherwise enhance the device.

Figure 8:
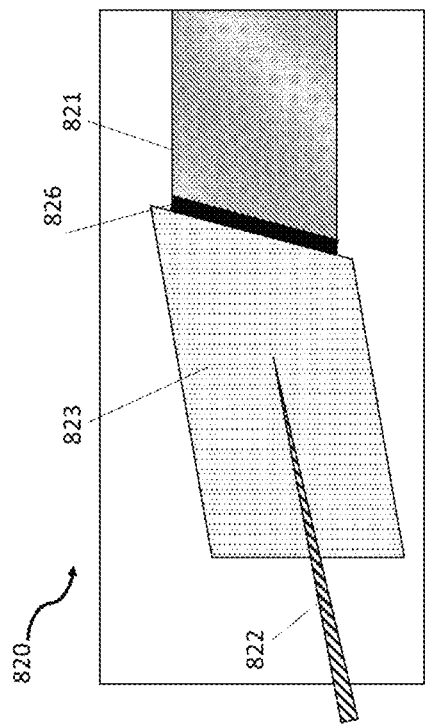
FIG. 8 illustrates two devices according to two of the embodiments of the embodiments corresponding to FIGS. 1 and 5, shown in cross-sectional top-down view.
Figure 8:
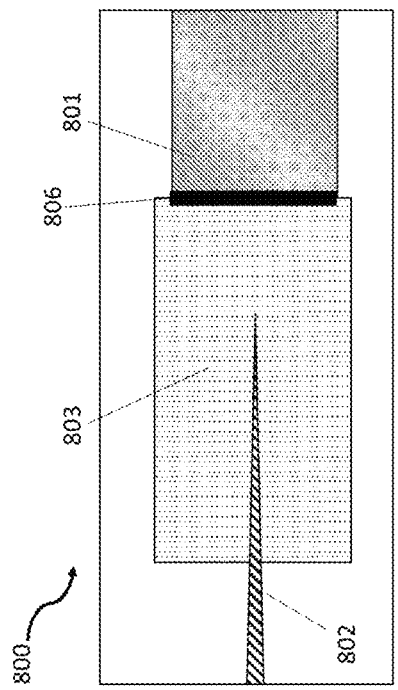

FIG. 8 shows top-down views of devices 800 and 820 according to embodiments of the present invention of either the FIG. 1 type or the FIG. 5 type that use different methods to achieve good optical coupling between, at least partially, butt-coupled high-refractive index layers on the right and low refractive index layers on the left. Device 800 has a "non-angled" interface between layers 801 and 803, meaning that the interface is substantially perpendicular to the optical axes on either side. As previously described in relation to devices 100, 300, 500 and 600, an optional coating layer (806 in the case shown) may be present to optimize reflection and/or transmission. Tapers may also be present in one or both of layers 802 and 803 to facilitate more efficient transmission between the layers (a taper in 802 is shown as an example).

The top-down views of device 820 show a different approach, where there is an intentionally non-perpendicular interface between layers in the first and third elements (layers 821 and 823 in device 820), meaning in turn that that interface is not perpendicular to the optical axes of waveguides formed in those layers. Deliberately providing such an angle can serve to reduce reflection or otherwise improve the performance of the transition. In the figure, the angle is shown as being in a lateral plane, the plane of the figure, but in some embodiments (not shown) the angle may be in a vertical plane or have components in both lateral and vertical planes. The angle between optical axis of layer 832 and 821 is being optimized depending on the angle between the interface and the optical axis of 821 and depending on the difference in refractive indices between 821 and 823. Simulations of possible angular arrangements, to optimize transition, are straightforward to perform with the use of commercial electromagnetic solvers. Optional coating layer 826 can further optimize reflection and/or transmission as described earlier in relation to 806, and a taper in 822, 823 and/or both may also serve to facilitate more efficient transmission between the layers.

In some embodiments (not shown), one of more waveguiding layers can be curved. The curved portions would be formed predominantly in 823, 822 and/or both as is known in the art of designing photonic integrated circuit waveguides in case of device 820. Devices 800 can also have curved portions in their corresponding regions.

Figure 9:
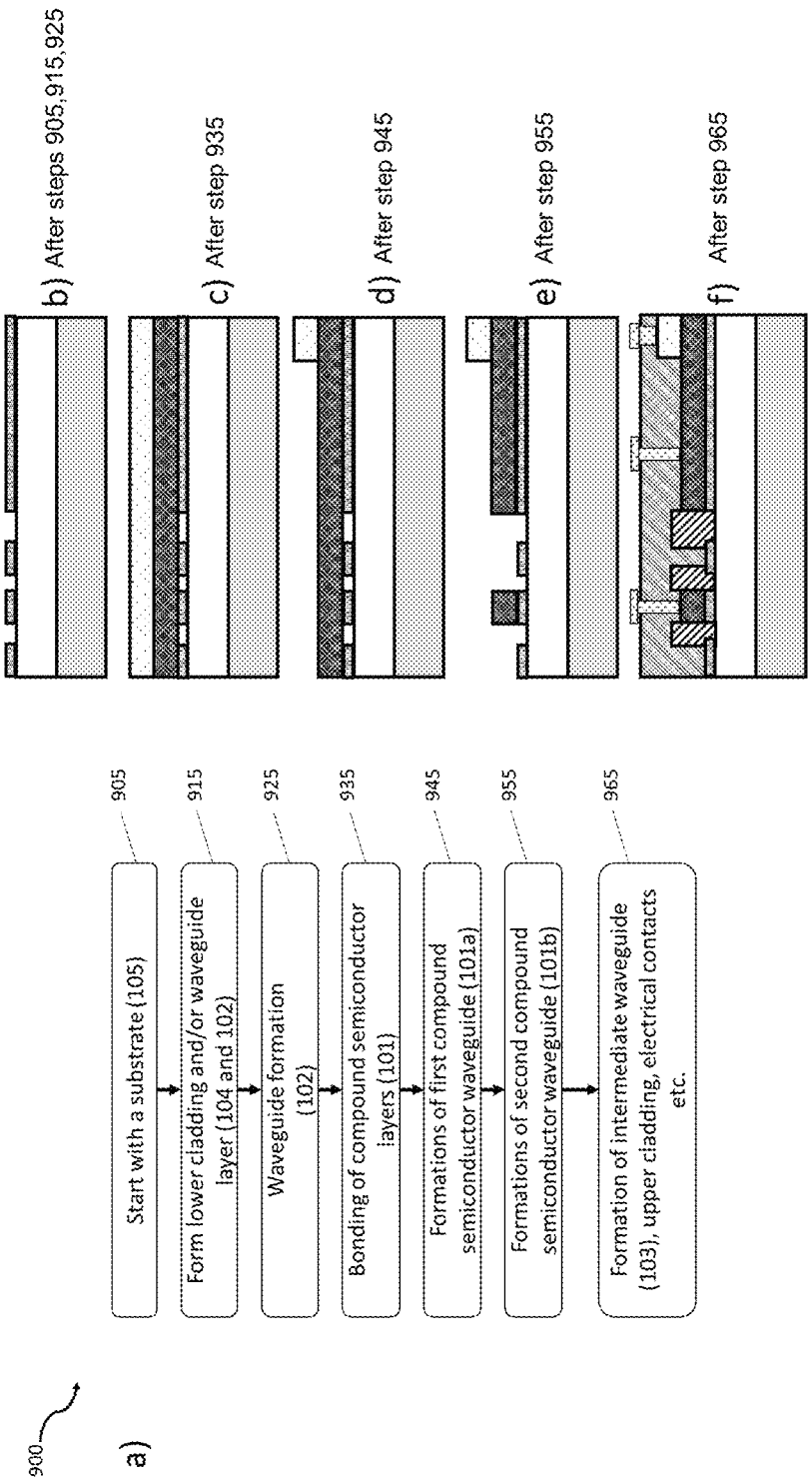
FIG. 9 is a process flow diagram of a method according to various embodiments of the present invention.

FIG. 9 is a process flow diagram of a method according to some embodiments of the present invention, showing some of the operations carried out to make integrated devices of the types described above in relation to FIGS. 1-4. The drawings on the right (b-f) show exemplary cross-sections after certain operations are carried out to make integrated devices are performed.

Method 900 for making the devices need not always include all the functions, operations, or actions shown, and need not include them in exactly the sequence illustrated by the sequence from blocks 905 through 965 as shown. Additional functions, operations, or actions can be included without departing from the spirit of invention. In an exemplary case, however, method 900 begins with block 905, in which a substrate such as substrate 105 in the FIG. 1 embodiment, suitably prepared for subsequent processing steps, is provided. Method 900 may then proceed from block 905 to block 915, where a first element, comprising one or more dielectric or other materials, is formed on the prepared substrate, by deposition, growth, transfer, bonding, etching or some other well-known technique to serve as lower cladding. This step is optional as explained above in relation to device 100. Next, materials suitable for the formation of a passive waveguide (e.g. 102) are formed by deposition, growth, transfer, planarization, bonding, etching or some other well-known technique.

From block 915, method 900 may proceed to block 925 where a waveguide (patterned such that it is "broken up" into at least four separate pieces spaced along the waveguide axis), and optionally other structures, such as, but not limited to, couplers, filters, resonators, gratings, etc. are defined, the waveguide comprising a core layer (102 in the case of FIG. 1) and optionally a lower cladding layer (104 in the case of FIG. 1). Subsequent steps (not shown) might include additional material deposition or removal in preparation for step 935 including planarization as described in relation to devices 200 and 220. At this stage, the first element of the device may be termed a passive element.

From block 925, method 900 may proceed to block 935 in which a second element, that may be termed an active element, typically involving an active semiconductor material 101, is bonded onto the top surface of the passive element (layer 102, 104 and/or 105, as described with regard to FIG. 1). This bonding can be direct molecular bonding or can use additional materials to facilitate bonding such as e.g. metal layers or polymer films as is known in the art. In general, there is no need for precise alignment, as subsequent processing of the active element is performed using common alignment marks defined on the common substrate (e.g. 105) or other layers already present on that common substrate as shown in FIG. 3 (alignment marks 320). Subsequently, alignment marks might be transferred to the active element during processing.

From block 935, method 900 may proceed to block 945, where a waveguide and optionally other structures, such as, but not limited to, couplers, filters, resonators, detectors, amplifiers, optical sources or other are defined in sub-layer (101a in FIG. 1) of active layer (101 in FIG. 1) in the active element.

Next, at step 955, another waveguide (101b in FIG. 1) and optionally other structures, such as, but not limited to, couplers, filters, resonators, detectors, amplifiers, modulators, optical sources or other are defined in a sub-layer (101b in FIG. 1) of the active layer (101 in FIG. 1) in the active element. Notice that patterning breaks up the waveguides in the active layer into at least two separate pieces, spaced along the waveguides' axes.

Next, at step 965, a third element, comprising one or more dielectric materials, polymers or other suitable materials is formed (by deposition, growth, transfer, bonding or some other well-known technique) and one or more intermediate waveguides are defined in that material such that each intermediate waveguide is in a location between a portion of and active waveguide and a passive waveguide, either butt-coupled (at least partially) and/or evanescently coupled thereto. An optional upper cladding (107) may be deposited, and electrical contacts may be formed, connecting the top surface to different pieces of the active layer. In some embodiments, additional material deposition or removal may occur during step 965, to, for example, deposit n or p contact metals, or remove etch stop layers. Further processing of the various dielectric and/or semiconductor layers, and/or electrical contacts, and the addition and processing of index matching layers, additional upper cladding, bonding pads, etc. may be performed as is known in the art.

A similar process flow diagram may readily be envisaged for a method according to embodiments of the present invention, showing some of the operations carried out to make integrated devices of the types described above in relation to FIGS. 5-7. It would include substantially similar steps as method 900, but mask sets and processing steps would be optimized to account for different material thicknesses, transition structures and placement/patterning of active and passive layers.

It is to be understood that in the various embodiments of devices described herein, optical coupling between modes in active and passive layers is reciprocal. It is to be understood that multiple such transitions with no limitation in their number or orientation can be realized on a suitably configured PIC.

Full functionality of the active platform is enabled with no need for regrowth that is typically performed at elevated temperatures leading to material degradation if coefficients of thermal expansion between used materials are too large which is commonly the case. In some embodiments optimized regrowth is used that does not result with device performance degradation.

Embodiments of the present invention offer many benefits. The integration platform enables scalable manufacturing of PICs made from multiple materials and capable of covering a wide wavelength range from visible to IR and handling high optical power compared to typical Si waveguide-based or InP waveguide-based PICs.

Previous approaches have generally used taper structures in order to transfer an optical mode from an active device to a passive device, where a width of compound semiconductor layer is adiabatically tapered down to sub-micron size. However, a required width of the taper tip decreases rapidly to tens of nanometer sizes for thicker active regions as the difference in refractive indices increases. The present invention deploys a butt coupling scheme to eliminate the need of a very small taper size in the compound semiconductor waveguide, which eases fabrication of such structures.

Other approaches have relied on die attachment of prefabricated optical active devices to passive waveguides. This requires very stringent alignment accuracy which is typically beyond what a typical die-bonder can provide. This aspect limits the throughput of this process as well as the performance of optical coupling.

This present invention utilizes a process flow consisting of typically wafer-bonding of a blanket piece of compound semiconductor material on a carrier wafer with dielectric or other types of waveguides and subsequent semiconductor fabrication processes as is known in the art. The use of a single common substrate, meaning that first, passive layers (in which passive waveguides may be defined) are formed on that substrate, and second, a structure containing active materials (in which active waveguides may be defined post bonding) is attached to the top surface before further processing continues, is a key feature of the present invention. The invention is also notable for enabling an accurate definition of optical alignment between active and passive waveguides via typically photo lithography step using common alignment marks, removing the need for precise physical alignment during bonding. Said photo lithography-based alignment allows for scalable manufacturing using wafer scale techniques.

Embodiments of the photonic integrated circuits described herein may be incorporated into various other devices and systems including, but not limited to, various optical networks, various computing and/or consumer electronic devices/appliances, communication systems, sensors and sensing systems.

It is to be understood that the disclosure teaches just a few examples and illustrative embodiments, that many variations of the invention can easily be devised by those skilled in the art after reading this disclosure, and that the scope of the present invention is to be determined by the following claims.

The invention claimed is:
1. A device comprising:
a plurality of waveguide structures fabricated on a common substrate; the plurality of waveguide structures comprising:

a first active waveguide structure supporting a first optical mode in a first sublayer and a second optical mode in a second sublayer;

a first intermediate waveguide structure, at least partly butt-coupled to a first end surface of the first active waveguide structure, supporting an intermediate optical mode;

a first passive waveguide structure supporting a passive optical mode, wherein a first tapered waveguide structure in at least one of the first intermediate waveguide structure and the first passive waveguide structure facilitates efficient mode transformation from the intermediate optical mode to the passive optical mode;

a second intermediate waveguide structure supporting the intermediate optical mode;

a second active waveguide structure having a first end surface at least partly butt-coupled to the second intermediate waveguide structure, the second active waveguide structure comprising a third sublayer supporting the second optical mode, wherein a second tapered waveguide structure in at least one of the second intermediate waveguide structure and the first passive waveguide structure facilitates efficient mode transformation from the passive optical mode to the intermediate optical mode in the second intermediate waveguide structure;

a third intermediate waveguide structure at least partly butt-coupled to a second end surface of the second active waveguide structure, the third intermediate waveguide structure supporting the intermediate optical mode; and a second passive waveguide structure supporting the passive optical mode, wherein a third tapered waveguide structure in at least one of the third intermediate waveguide structure and the second passive waveguide structure facilitates efficient mode transformation from the intermediate optical mode in the third intermediate waveguide structure to the passive optical mode in the second passive waveguide structure;

wherein the plurality of waveguide structures is disposed axially in a sequence having an order starting with the first active waveguide structure, followed by the first intermediate waveguide structure, the first passive waveguide structure, the second intermediate waveguide structure, the second active waveguide structure, and the third intermediate waveguide structure in turn, and ending with the second passive waveguide structure;

wherein lithographic alignment marks facilitate precise mutual alignments between layers defining each of the plurality of waveguide structures.

2. The device of claim 1,
further comprising a first pair of electrical contacts connected to the first sub-layer of the first active waveguide structure and a second pair of electrical contacts connected to the third sub-layer of the second active waveguide structure.

3. The device of claim 1,
wherein the second sub-layer of the first active waveguide structure is thicker than 200 nm; and
wherein the third sub-layer of the second active waveguide structure is thicker than 200 nm.

4. The device of claim 1,
wherein the intermediate waveguide structures have planarized lower surfaces, overlying planarized top surfaces of the passive waveguide structures.

5. The device of claim 1,
wherein the third sub-layer of the second active waveguide structure is partially etched to facilitate lateral optical mode confinement and reduce optical mode overlap with metal.

6. The device of claim 1,
wherein the first sub-layer of the first active waveguide structure provides electrically pumped optical gain functionality.

7. The device of claim 1,
wherein either the second sub-layer of the first active waveguide structure or the third sub-layer of the second active waveguide structure provides at least one of phase and amplitude modulation.

8. A device comprising:
a plurality of waveguide structures fabricated on a common substrate; the plurality of waveguide structures comprising:

a first active waveguide structure comprising first and second sub-layers supporting a first optical mode, dominantly residing in the first sub-layer;

a first intermediate waveguide structure, at least partly butt-coupled to a first end surface of the first active waveguide structure, supporting an intermediate optical mode, and a first passive waveguide structure supporting a passive optical mode, wherein a first tapered waveguide structure in at least one of the first intermediate waveguide structure and the first passive waveguide structure facilitates efficient mode transformation from the intermediate optical mode to the passive optical mode in the first passive waveguide structure;

a second active waveguide structure comprising a stack of sublayers comprising:
a third sublayer overlying a first contact layer;
a fourth sublayer, underlying the first contact layer, the fourth sublayer supporting a second optical mode; and
a second contact layer underlying the fourth sublayer;

wherein patterning of the third and fourth sublayers and the first and second contact sublayers allows separate electrical contact to be made from a top surface of the device to each of the first and second contact layers and provides a desired degree of lateral confinement of the second optical mode; and a second passive waveguide structure supporting the passive optical mode, wherein a second tapered waveguide structure in at least one of the second active waveguide structure and the second passive waveguide structure facilitates efficient mode transformation from the second optical mode to the passive optical mode in the second passive waveguide structure;

wherein lithographic alignment marks facilitate precise mutual alignments between layers defining each of the plurality of waveguide structures.

9. The device of claim 8,
further comprising a first pair of electrical contacts connected to the first sub-layer of the first waveguide structure, and a second pair of electrical contacts connected to the third sub-layer of the second active waveguide structure.

10. The device of claim 8,
wherein the second sub-layer is thinner than 200 nm; and
wherein the fourth sub-layer is thinner than 200 nm.

11. The device of claim 8,
wherein the intermediate waveguide structures have planarized lower surfaces, overlying planarized top surfaces of the passive waveguide structures.

12. The device of claim 8,
wherein the third sub-layer of the second active waveguide structure comprises a material deposited and patterned to facilitate lateral optical mode confinement and reduce optical mode overlap with metal.

13. The device of claim 8,
wherein a tapered waveguide structure in the second active waveguide structure has at least two stages.

14. The device of claim 8,
wherein the first sub-layer of the first active waveguide structure provides electrically pumped optical gain functionality.

15. The device of claim 8,
wherein the third sub-layer of the second active waveguide structure provides at least one of phase and amplitude modulation.

* * * * *